United States Patent Office 3,551,533
Patented Dec. 29, 1970

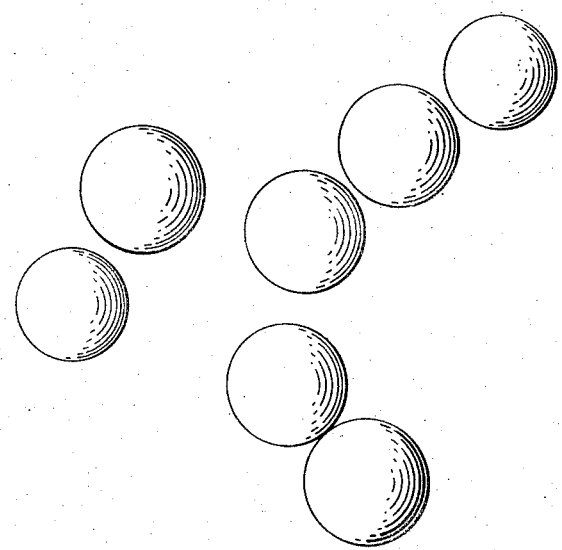
INVENTORS: F. R. MONFORTE
F. J. SCHNETTLER
BY
ATTORNEY

3,551,533
METHOD OF FORMING PARTICULATE MATERIAL
Frank R. Monforte, Passaic Township, Morris County, and Frank J. Schnettler, Morris Township, Morris County, N.J., assignors to Bell Telephone Laboratories, Incorporated, Murray Hill and Berkeley Heights, N.J., a corporation of New York
Filed Apr. 10, 1967, Ser. No. 629,788
Int. Cl. B22d 23/08
U.S. Cl. 264—14         5 Claims

ABSTRACT OF THE DISCLOSURE

Particulate matter of a wide range of materials including refractory oxides is prepared by freeze-drying an atomized solution. The matter may be in the form of uniform spheres or of fine powder.

BACKGROUND OF THE INVENTION

(1) Field of the invention

The invention is concerned with the preparation of particulate matter of a wide range of materials. Such matter may be in the form of uniform spheres or fine powder. Uses include filter beds, catalyst supports, metallizing paste, abrasives, etc.

(2) Description of the prior art

Fine powders, as for abrasive use, are commercially prepared from sintered material which is ground or hammered. Such pulverizing may be prolonged, particularly where fine powders are required, and uniformity often requires careful sifting.

Spherical particles are often prepared by freezing molten materials while freely suspended in liquids. Such procedures are readily applied to metallic or other fusible materials. Formation of spheres of refractory materials, that is, materials which decompose or are otherwise not easily rendered liquid, is not easily accomplished. So far, as is known, general techniques are not available.

SUMMARY OF THE INVENTION

Freeze-drying of an atomized liquid solution results in a variety of useful end products, both with regard to structure and composition. In accordance with the procedure a solution of the desired solute material is broken up into fine droplets by any of a variety of techniques. The droplets are rapidly frozen so as to prevent substantial coalescence and the solvent is removed by sublimation. Initial dried droplets are spherical in configuration, with diameters which may be of the order of mils. Dimensions are fixed in accordance with the atomizing conditions.

Dried droplets are porous, with pore size and spacing determined primarily by the concentration of the initial solution. Such dried droplets may be used without further processing or may be converted to some desired end product as, for example, by thermal decomposition, by reduction, or by other chemical reaction. In addition, the spherical drops may easily be converted to fine powder of angstrom or micron dimensions by simple crushing.

In either form, spherical or powder, the end product is uniform.

It is convenient to discuss the invention in terms of a water solvent. Since most ingredients are available in water-soluble form, the use of the aqueous solution constitutes a preferred embodiment. Nevertheless, other solvents which may be sublimed are suitable. Alternatives include mercuric chloride, iodine, and camphor.

BRIEF DESCRIPTION OF THE DRAWING

The figure is a reproduction of a photograph of a spherical end product produced in accordance with the invention.

DETAILED DESCRIPTION

It is convenient to discuss permitted parameter ranges in conjunction with an outline of the process.

(1) Formation of solution

The solvent, as has been stated, may be water or anything else that can be frozen and removed by sublimation. The latter requirement arises from the need to remove solvent without producing a liquid phase with the attendant increase in solute mobility, which, in turn, results in segregation. The solute material, which may be but a single component but which, in a preferred embodiment, may include at least two components, if soluble in its final desired form may be so utilized in the solution.

Where the final desired form is not soluble in the solvent of concern, it must be put in a soluble form. Soluble forms must, of course, be capable of yielding the desired composition after drying. One manner in which the conversion can be made is by thermal decomposition. Chemical reduction and reaction are also feasible. Inorganic oxides such as are utilized in many ferrimagnetic compositions are essentially insoluble in water and in many other solvents. It has been found expedient to render them soluble by converting them to the corresponding sulphates. Other salts such as carbonates, nitrates, nitrites, etc., may be used. Any such starting materials are added in stoichiometric ratio to the solvent.

Generally, commercial considerations dictate use of concentrations near the saturation limit in the liquid phase at the freezing temperature. Reducing concentration results in the need for larger volume solvent removal and consequent increased expenditure in energy, apparatus, etc.

It is generally undesirable to exceed the saturation solubility content since this results in precipitation which, in the case of a multicomponent system, may produce a compositional gradient. Nevertheless, exceeding the saturation limit by a small amount, not to exceed about 10 percent, may under quick-freeze conditions result in a uniform dispersion of a second phase such as has been found desirable in certain ferrimagnetic ceramics and also in certain ferromagnetic metallics. The same result obtains by use of an additional, substantially insoluble additive.

There are also circumstances where it is desirable to use lesser quantities of solute material. Decreasing the solute-to-solvent ratio results in greater porosity in the dried particulate material, with concomitant increased surface area and increased friability. The latter is desirable where the final compacted product has at least one small dimension of microns or has in magnitude, as, for example, in a ferrite sheet or an alumina coating. While the dilution limit is generally to be determined on the basis of desired end product and on economic considerations, reasonable yield usually dictates use of a solute system content which is at least 5 percent of the saturation content of the entire system in the liquid phase at the freezing point.

It is, of course, an advantage of the procedure that mixing occurs on a molecular scale during dissolution. Such mixing may be accelerated by mechanical stirring and/or by heating, and such may prove expedient where the saturation limit is approached.

Other considerations are apparent and are generally implicit in the foregoing description. For example, it is sometimes necessary to buffer or otherwise adjust the pH of the solution with a view to stabilizing the composition.

(2) Droplet formation

Formation of droplets, generally referred to as atomizing, may take any conventional form. In the examples, it was found convenient to atomize by forcing the solution through an orifice. Alternative procedures include interaction of a rotated disk or air currents with a stream. Droplet sizes, which are a function of orifice size and flow rate, were found to vary from a fraction of a millimeter to several millimeters.

(3) Freezing

It is a requirement that freezing be conducted with sufficient rapidity to prevent substantial coalescence. In general, where droplet collection is by gravity, this gives rise to the requirement that freezing be sufficiently rapid such that all particles are frozen before they strike a solid surface such as the vessel floor. In multicomponent systems, where ultimate homogeneity is desired, still more rapid freezing minimizes compositional gradients. Even where the requirement for extreme compositional homogeneity exists, such may be attained by use of very small droplets and/or by dilute solutions without further adjustment in freezing rate. Particularly where larger droplet sizes are used in multicomponent systems, it may be desirable to use more rapid freezing rates. Generally, it has been found that freezing brought about in a period of one second or less with a preferred time of 0.05 second or less assures adequate compositional homogeneity.

For most expedient operation, it has been found desirable to start cooling the droplets upon formation. This may be accomplished by atomizing immediately before entering a refrigerating fluid. So, for example, droplets have been formed by passage of solution through an orifice inserted in liquid isoheptane maintained at a temperature of −80° C. Other techniques which have proven satisfactory include spraying a mist of solution into liquid nitrogen. It is apparent that more rapid freezing resulting from higher heat capacity in the refrigerant gives rise to a preference for liquids. Suitable refrigerants, in addition to those named, include hexane, cumene, and dimethylbutane. In general, the requirement is that the refrigerant be liquid at the freezing temperature of the solution and, of course, that no deleterious reaction occur. It is necessary, too, that the refrigerant and the solvent solute system be substantially immiscible. Use of vapors may also be appropriate, although the decreased heat capacity and thermal conductivity results in slower freezing. Also the desire to prevent substantial coalescence may result in smaller solution-to-refrigerant volume ratios. The value of this ratio is dependent on a number of factors including freezing rate and heat capacity of refrigerant. Experimental conditions which have proven suitable involve a volume ratio of 1:2 to 1:100. Such values should not be considered limitations on the inventive processes and are included only to assist the person repeating the experimental work included in the disclosure.

Regardless of the refrigerant used, greater efficiency results from stirring. Stirring, which inter alia avoids localized heating and possible segregation, may take the form of flowing refrigerant or agitation as by mechanical agitators.

(4) Collection of frozen droplets

Collection may simply take place under the influence of gravity as on a vessel floor, or use may be made of a flow system, with droplets being continuously injected into a moving stream of refrigerant. Collection should, of course, be at a temperature lower than that of the freezing point of the solution. Ordinary precautions should be taken to prevent substantial solid-solid diffusion. For example, the weight of collected frozen droplets should not be sufficient to substantially depresss the melting temperature in the case of an aqueous solution.

(5) Sublimation

The main requirement is that no part of the solution be permitted to exist in the liquid phase during this procedural step. In other words, it is necessary that conditions be such that solvent removal occur below the point at which a liquid phase can exist at equilibrium. Sublimation conditions are generally limited by the nature of the apparatus used. It is generally desirable to remove solvent as quickly as possible. Limiting conditions include the maximum rate at which heat may be introduced into the system, as well as the maximum rate at which solvent may be removed. A volatilization rate of solvent which exceeds the removal rate of solvent necessarily results in an increase in pressure.

It is apparent that with aqueous systems at least, the sublimation process must be carried out in a partial vacuum. The equilibrium point of concern in aqueous systems in general occurs at less than 4.5 millimeters of mercury. To permit some reasonable margin, it is generally desirable to operate at pressures of no greater than about one millimeter of mercury. Still lower pressures are permitted, and, since they result in an increased sublimation rate, are desired. Readily available commercial vacuum pumps permit operation at pressures of the order of 0.1 millimeter of mercury. The only minimal pressure limitation is introduced by reason of economic considerations.

Once the pressure has been reduced to the desired level, sublimation may be permitted to proceed naturally. Commercially expedient rates are however achieved, at least in an aqueous solution, only by putting heat into the system. It is clear that the maximum permitted heat introduction depends on factors such as heat transfer, decomposition temperature, if any, etc.

(6) Conversion

It has been indicated that the dried particles may be incorporated directly in the final body. However, for most commercially significant systems which have been studied thus far, it is found that the final chemical composition is not sufficiently soluble in most readily available solvents. It is sometimes necessary to convert such chemical compositions to a soluble form in order to form the solution. Where this has been done, it is necessary at this stage in the procedure to convert back from the soluble form. In the case of oxidic materials, the conversion may expediently take the form of a thermal decomposition with gaseous evolution to yield the oxidic form from the soluble salt. Such optional procedure requires heating to above the decomposition temperature. Usual economic considerations may dictate the actual temperature used. However, certain temperature-dependent effects should be considered. For example, it has been found that higher temperature or longer time may result in increased particle size. Reference is here had not to the droplet size, which is generally substantially unaffected during this step but rather to the ultimate particle which may result from crushing the dried droplet. Such particle size, which may be of concern in the formation of extremely fine structures, has been found to range from several angstrom units to one or several microns.

Simply by way of example, where the soluble salts are sulphates, satisfactory decomposition temperatures, of course depending on the nature of the cations, range from about 400 to about 1200° C.

(7) Crushing

Where a fine powder rather than a spherical end product is desired, this may be simply accomplished by crushing. Friability results from the porous nature of the spheres, as has been indicated. Where advantage is to be taken of this property in the preparation of fine powders, conditions are arranged for the desired porosity. This includes not only selection of appropriate solute concentration but also in tailoring of any heat treatment to prevent substantial densification. Where, for example, there is a thermal decomposition required, this is carried out at such temperature and for such time as is barely necessary to bring about the decomposition. These conditions are readily measured in terms of gaseous evolution which ordinarily accompanies such decomposition. If heating is carried out for substantial periods beyond breakdown, the effect is to shrink the sphere, reduce the pore size, and finally to require greater force to break the sphere into a powder. While this may be accomplished with ball milling or some other drastic form of grinding, there would seem to be little reason for pursuing this procedure, it being one of the advantages of the invention that powders may be produced by simple crushing.

Suitable apparatus for breaking the friable spheres into fine powder include impeller type or whirling blade type colloid mills. Such apparatus, which is merely exemplary, utilizes suspension of the spherical dried drops in a nonsolvent liquid such as water. Centrifugal momentum is imparted the suspension by means of a rotating member, and the material is rapidly forced through apertures so that crushing results from the shearing action. It has been indicated that ultimate particle size is here dependent on the porosity of the spheres. Since only the fine walls between pores are severed during the crushing operation, very slight pressures are suitable. Powder particle dimensions of less than 100 A. to about a micron may result from appropriate control of concentration. The figure is reproduced from a photograph originally made at a magnification of 25 times. It shows several spheres of aluminum oxide produced in accordance with Example 2 below. The spheres shown vary in size from about 0.3 to 0.4 millimeter.

Exemplary conditions and resulting dimensions are apparent from the examples.

EXAMPLES

Based on a large number of experimental runs, the conclusion has been reached that the physical form of the end product, be it spherical dried droplet or ultimate powder, is substantially independent of composition. With the exception, as noted, that excess heating reduces the friable nature of the sphere, it makes little difference whether the final particulate matter is of the same composition or of a different composition from the soluble species. Sphere size, it has been indicated, is totally dependent upon atomizing conditions. Diameter in the experiments conducted has varied from about ten to about 150 mils. Either limit may be exceeded. Four examples are set forth to illustrate the atomizing conditions responsible for sphere dimension. For convenience, all relate to preparation of the same material, aluminum oxide. Atomizing was accomplished in each example by forcing an aqueous solution of aluminum sulfate through a nozzle. For convenience, all processing conditions were held constant from example to example, and only nozzle size and flow rate were varied. In each example, 26 milligrams of aluminum sulfate were dissolved in 100 milliliters of water. In each example, the resulting solution at room temperature was forced through the nozzle, and the atomized droplets were, in turn, introduced into a 2-liter vessel containing 1 liter of hexane maintained at —80 degrees centigrade. In each instance, freezing occurred within about .05 second, and uncoalesced frozen droplets were collected by gravity on the floor of the vessel. In each example, the resulting droplets were dried by placing in a vacuum chamber maintained at a pressure of 0.1 millimeter of mercury and by heating on a platen maintained at 100 degrees centigrade. Drying occurred in about 24 hours. The final product, aluminum oxide, was prepared by heat decomposition of the dried droplets by heating at 1000 degrees centigrade for a period of about 2 hours.

Each example is made up of two parts. In the first part, the solution was forced through the nozzle at a pressure of one pound per square inch. In the second part it was forced through the same nozzle at a pressure of 2¼ pounds per square inch. All spheres were eventually crushed on a colloid mill to produce powder particles of about 100 A. unit dimension.

| Example No. | Nozzle size | Pressure, p.s.i. | Flow rate, ml./min. | Sphere diameter in inches |
|---|---|---|---|---|
| 1 | 0.010 | 1 | 8 | 0.025 |
| | | 2.25 | 18 | 0.020 |
| 2 | 0.019 | 1 | 16 | 0.035 |
| | | 2.25 | 41 | 0.025 |
| 3 | 0.027 | 1 | 22 | 0.050 |
| | | 2.25 | 88 | 0.040 |
| 4 | 0.057 | 1 | 182 | 0.100 |
| | | 2.25 | 260 | 0.095 |

The invention has been described in a limited number of embodiments. It derives from the important discovery that freeze-drying of an atomized drop results in close physical and compositional control of a final particulate product. The product may take the form of a sphere, either of the dissolved material or of some composition which results from conversion of the dissolved material, or it may be the corresponding crushed powder. Many types of apparatus and many process variations are suitable in any one of the processing steps. All such procedural modifications are considered to be within the scope of the claimed invention.

It is not considered within the appropriate scope of the disclosure to set forth the various uses for the inventive product. It is clear that there are countless such uses, any of which may benefit from any of the advantageous properties of the product. It has been noted that these properties include spherical configuration, regularity of dimension, friable nature, large effective surface area, large porosity, fine ultimate particle size, close compositional tolerance, etc. Uses which may benefit from any of the foregoing include abrasive materials, reactor fuel beads, catalyst supports, magnetic particles for use in recording media, dessicants, feed mixtures for Verneuil torches, high purity oxides for crystal growth, metallizing paste components, feed material for flame-sprayed coatings, and ion exchange media. Such uses are merely illustrative.

It has been indicated that final configuration is essentially composition independent. It has been indicated that compositions may be identical to those originally in solution or may be derived therefrom by any means. The foregoing uses suggest corresponding categories of compositions. It is clear the end product may be a compound, as, for example, an oxide, a fluoride, a hydride, or any salt, or it may be elemental, metallic or nonmetallic. The only requirement is that the material be capable of going into solution in some form that may ultimately yield the desired composition. By the same token, the composition may be single or multicomponent.

What is claimed is:

1. Process for making a particulate product of a desired composition comprising freezing a solution of a solute system capable of yielding the said composition in a fluid which is substantially immiscible with respect to the said solution and removing the said solvent by sublimation, characterized in that the solution is atomized to form droplets, and that the droplets are frozen at such rate as to prevent substantial coalescence in which the desired composition is different from the solute system, and in which conversion from the solute system to the desired composition is brought about subsequent to sublimation.

2. Process of claim 1 in which the said conversion is brought about by heating.

3. Process of claim 2 in which the desired composition is oxidic.

4. Process of claim 1 in which the desired composition is crushed subsequent to sublimation.

5. Process of claim 1 in which the said fluid is a liquid.

References Cited
UNITED STATES PATENTS

| | | | |
|---|---|---|---|
| 3,281,950 | 11/1966 | Kautz | 34—5 |
| 3,056,671 | 10/1962 | Winants et al. | 264—13 |
| 2,888,713 | 6/1959 | Cook et al. | 264—13 |
| 3,364,690 | 1/1968 | Torobin | 62—58 |

ROBERT F. WHITE, Primary Examiner

R. H. SHEAR, Assistant Examiner

U.S. Cl. X.R.

264—28